No. 682,250.  
J. H. GLAUBER.  
COUPLING JOINT.  
(Application filed Jan. 11, 1901.)  
Patented Sept. 10, 1901.

(No Model.)

ATTEST  
R. B. Moore  
M. A. Sheehan

INVENTOR  
Joseph H. Glauber  
BY H. T. Fisher  
ATTY

UNITED STATES PATENT OFFICE.

JOSEPH H. GLAUBER, OF CLEVELAND, OHIO.

COUPLING-JOINT.

SPECIFICATION forming part of Letters Patent No. 682,250, dated September 10, 1901.

Application filed January 11, 1901. Serial No. 42,885. (No model.)

*To all whom it may concern:*

Be it known that I, JOSEPH H. GLAUBER, a citizen of the United States, residing at Cleveland, in the county of Cuyahoga and State of Ohio, have invented certain new and useful Improvements in Coupling-Joints; and I do declare that the following is a full, clear, and exact description of the invention, which will enable others skilled in the art to which it appertains to make and use the same.

My invention relates to coupling-joints or couplings of the kind more especially which are used in making bath-tub connections, but is not limited to such use; and the invention consists in a coupling adapted to make fluid-tight engagements and to serve the purposes substantially as shown and described, and particularly pointed out in the claims.

Figure 1:
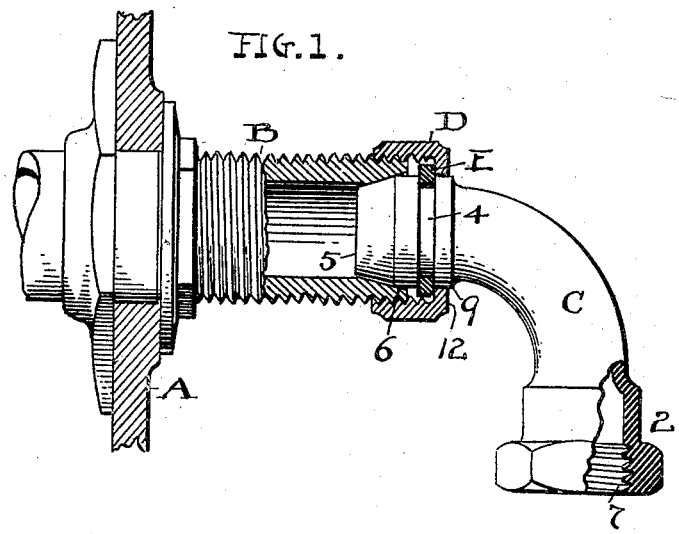
Figure 2:
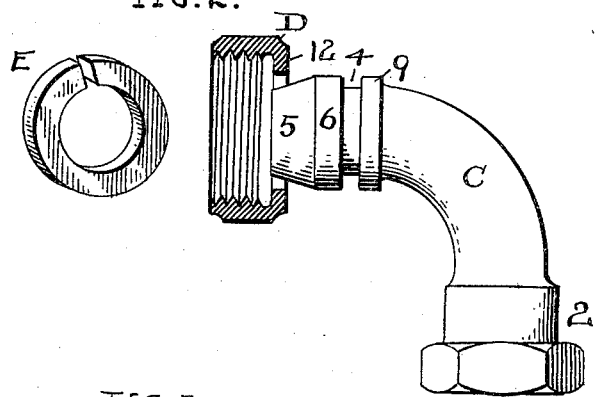
Figure 3:
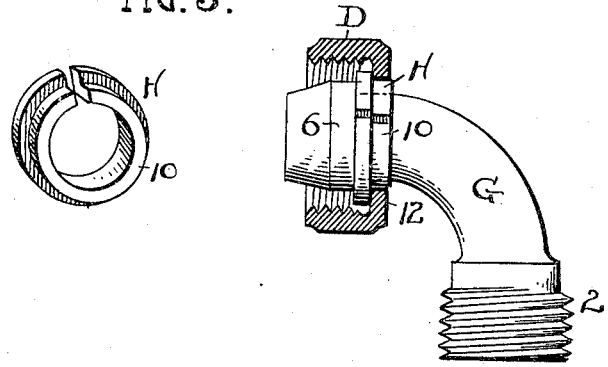

In the accompanying drawings, Figure 1 is a side elevation of a coupling-joint embodying my invention and in which all the members of complete connection are represented. Fig. 2 is a view of a group of elements comprised in my invention and including the elbow-shaped pipe-joint, the connecting-nut, and the ring which confines the nut and forms its bearing. Fig. 3 is a modification of both the joint and the ring, with a detail of the ring.

For the purposes of this description it may be assumed that A represents a section of one end of a bath-tub, and B the usual coupling member fastened therein and carrying the bib on its broken-away portion, but not shown here. No novelty is claimed for any of the features exclusively associated with part B and the tub, and for that matter my invention might be shown in connection with any other article than a bath-tub and serve my purpose as well.

C is a rigid metal elbow-shaped joint, which, however, may be straight or of any other useful shape between its ends and be within my invention. In connection with baths it generally is of the elbow shape and in the working relation substantially as here shown. Said part has an integral head 2 at what may be termed its "lower" or "outer" end and an annular channel or groove 4 at its inner or upper end, as shown in Figs. 1 and 2. At its extremity 5 the said part is here shown as tapered or beveled to seat snugly in or upon the end of part B.

Now in order to understand the advantages of this construction it may be mentioned that heretofore it has been impossible to place a nut on a joint of this kind without making said part in two pieces, because invariably there was a fixed collar on the upper end of the joint, which formed the bearing for the nut, and the lower end of the joint was too large to slip the nut on at that end. Hence all such joints had to be made in at least two pieces, which could not be united until the nut was put in place. Then as said pieces were permanently united the nut was immovably confined and there was no adaptation to different sizes in part B nor for any other difference in conditions.

By my invention I am enabled to form head 2 on the joint of any desired style or size, and am also enabled to slip nut D over the upper end of the said joint into place for use and to remove the same at pleasure. This is made possible by means of a suitable ring E, which is split or severed at one place preferably and, as shown, is of flexible or spring metal, adapted to be sprung over shoulder 6 into channel 4 behind said shoulder. Being of springy material, said ring can also be removed, and it always is put in place after nut D.

The chief and probably most important advantage of this construction of parts lies in the assembling of the parts for use, as it makes it possible for the first time for a plumber to go with the joint C alone to a bath-tub or other place of coupling and equip the coupling with the other parts on the spot as may be needed. Heretofore the joint C itself had to be made up from at least two separate pieces, and the nut had to be put on at the factory before said pieces were united because it could not be slipped over the other end. Once on the nut could never be removed without destroying it or the joint, because, generally, the pieces of the joint were soldered or brazed together. There was no adaptation, therefore, for possibly a different size of connecting part B or for any other local condition to which the joint was taken, and the entire structure was arbitrary and unchangeable, regardless of conditions to be met. By my improvement I can use nuts of different sizes within all ordinary requirements according to the place, and if one does not suit I can take it off and put on one that does. There also is adaptation in ring E to necks of different sizes and cross-section, and thus it follows that I can send the parts out separately or collectively, as may be desired.

In Fig. 3 I show a modification of a coupling-joint G which retains shoulder 6 of the other style, but omits the shoulder 9 and also the feature of channel 4, and is uniform in cross-section up to shoulder 6; but I get the same effect practically as in the other form and have the ring and nut attachable and detachable in like manner. In this case ring H is supplied with a subring portion 10, adapted to fill out the nut about its inturned flanged portion 12, which also adds to the appearance of the joint. This style of joint has an externally-threaded head, while joint C has an internally-threaded head. Either form of head and any equivalent thereof may be used; but it is understood that whatever head be used it is too large to pass the nut over it. The rings E and H might be divided at an inclination with overlapping beveled ends instead of straight across, and they might be made and inserted, say, in two pieces, and still serve the same purpose, though of course not so conveniently. This part of the invention, therefore, consists of a divided ring, whether it be divided at one or more places and into one or more parts.

What I claim is—

1. A coupling-joint cast complete in one piece and having a threaded head at one end and an annular shoulder of less size than said head around its other end and provided with a conical seating projection outside said shoulder, and a removable ring of greater depth than said shoulder engaged behind the same, substantially as described.

2. As a new article of manufacture, a coupling formed in one piece and having a conical seating projection at one end and an annular shoulder substantially at the base of said projection and a threaded head on the other end of the coupling larger in cross-section than said annular shoulder, a removable ring engaged behind said shoulder and a coupling-nut behind said ring, substantially as described.

3. A fixed coupling member having an outwardly-flaring internal seat and threaded about its outside, in combination with a coupling-joint having a tapered extremity adapted to said seat and an annular shoulder about its outside back from said tapered extremity, a loose divided ring of spring metal behind said shoulder and extended outwardly therefrom, and a nut engaged over said ring and screwed upon said fixed member, substantially as described.

Witness my hand to the foregoing specification this 19th day of December, 1900.

JOSEPH H. GLAUBER.

Witnesses:
H. T. FISHER,
R. B. MOSER.